(12) United States Patent
Kalaboukis et al.

(10) Patent No.: US 7,954,058 B2
(45) Date of Patent: May 31, 2011

(54) SHARING OF CONTENT AND HOP DISTANCE OVER A SOCIAL NETWORK

(75) Inventors: Chris Kalaboukis, Los Gatos, CA (US); Eun-Gyu Kim, Mountain View, CA (US)

(73) Assignee: Yahoo! Inc., Sunnyvale, CA (US)

(*) Notice: Subject to any disclaimer, the term of this patent is extended or adjusted under 35 U.S.C. 154(b) by 655 days.

(21) Appl. No.: 11/956,875

(22) Filed: Dec. 14, 2007

(65) Prior Publication Data

US 2009/0158176 A1 Jun. 18, 2009

(51) Int. Cl.
*G06F 3/00* (2006.01)
*G06F 15/16* (2006.01)

(52) U.S. Cl. ........ 715/753; 715/752; 715/758; 715/733; 715/205; 709/204; 709/217; 709/218

(58) Field of Classification Search .................. 715/733, 715/751, 752, 753, 758, 760, 769, 770, 205; 709/204, 207, 217, 218
See application file for complete search history.

(56) References Cited

U.S. PATENT DOCUMENTS

| | | | |
|---|---|---|---|
| 7,024,404 B1 | 4/2006 | Gerasoulis et al. | |
| 7,174,382 B2 | 2/2007 | Ramanathan et al. | |
| 7,366,759 B2 | 4/2008 | Trevithick et al. | |
| 7,376,715 B2 | 5/2008 | Cunningham et al. | |
| 2002/0073204 A1* | 6/2002 | Dutta et al. | 709/227 |
| 2002/0138581 A1* | 9/2002 | MacIntosh et al. | 709/206 |
| 2004/0054733 A1 | 3/2004 | Weeks | |
| 2004/0162071 A1 | 8/2004 | Grilli et al. | |
| 2005/0171954 A1 | 8/2005 | Hull et al. | |
| 2005/0174975 A1 | 8/2005 | Mgrdechian et al. | |
| 2005/0198160 A1 | 9/2005 | Shannon et al. | |
| 2005/0203800 A1* | 9/2005 | Sweeney et al. | 705/14 |
| 2005/0203801 A1 | 9/2005 | Morgenstern et al. | |
| 2005/0278438 A1 | 12/2005 | Sandaire | |
| 2006/0042483 A1 | 3/2006 | Work et al. | |
| 2006/0143236 A1 | 6/2006 | Wu | |
| 2006/0173824 A1* | 8/2006 | Bensky et al. | 707/3 |

(Continued)

FOREIGN PATENT DOCUMENTS

EP 1591939 A2 11/2005

OTHER PUBLICATIONS

U.S. Appl. No. 11/508,596, filed Aug. 22, 2008.

(Continued)

*Primary Examiner* — Xiomar Bautista
(74) *Attorney, Agent, or Firm* — Frommer Lawrence & Haug LLP; Jamie L. Wiegand

(57) ABSTRACT

A method, system, and apparatus are directed to sharing information over a network. A drag-and-drop of a selection of a portion of content may be received at a sharing area. A sharing message may be generated based on a type of the portion. If the type of the portion indicates storage, the sharing message may comprise a hyperlink to a storage. The sharing message may be useable for providing the portion on at least one client device associated with at least one of a plurality of members of a social network. Sharing over the network of the portion between an originating sharing member and the plurality of members of the social network may be enabled. The portion may be shared for a customizable project. A hop distance may be provided for the shared portion.

20 Claims, 7 Drawing Sheets

U.S. PATENT DOCUMENTS

| | | | |
|---|---|---|---|
| 2006/0235873 | A1 | 10/2006 | Thomas |
| 2006/0271564 | A1 | 11/2006 | Muntz et al. |
| 2007/0088711 | A1 | 4/2007 | Craggs |
| 2007/0088785 | A1 | 4/2007 | Cama |
| 2007/0112761 | A1 | 5/2007 | Xu et al. |
| 2007/0169165 | A1 | 7/2007 | Crull et al. |
| 2007/0179945 | A1* | 8/2007 | Marston et al. .............. 707/5 |
| 2007/0180043 | A1 | 8/2007 | Vernal et al. |
| 2007/0252004 | A1 | 11/2007 | Shiraki et al. |
| 2007/0255807 | A1 | 11/2007 | Hayashi et al. |
| 2007/0271336 | A1 | 11/2007 | Ramaswamy |
| 2008/0004944 | A1 | 1/2008 | Calabria |
| 2008/0005108 | A1 | 1/2008 | Ozzie et al. |
| 2008/0028294 | A1 | 1/2008 | Sell et al. |
| 2008/0052371 | A1 | 2/2008 | Partovi et al. |
| 2008/0301237 | A1 | 12/2008 | Parsons et al. |
| 2009/0143051 | A1 | 6/2009 | Kim |
| 2009/0144377 | A1 | 6/2009 | Kim et al. |
| 2009/0157845 | A1 | 6/2009 | Kim et al. |
| 2009/0158176 | A1 | 6/2009 | Kalaboukis et al. |
| 2009/0319628 | A1 | 12/2009 | Kumpula et al. |
| 2010/0042944 | A1 | 2/2010 | Robinson et al. |
| 2010/0169492 | A1 | 7/2010 | Lee |

OTHER PUBLICATIONS

Pownce, Wikipedia, pp. 1-2 http://en.wikipedia.org/w/index,php?title-Pwonce&Printable=yes, Nov. 27, 2007.

Pownce, Sent stuff to your friends, pp. 1-3 http://pownce.com, Nov. 27, 2007.

Office Communication for U.S. Appl. No. 11/947,647 mailed Apr. 15, 2010.

Office Communication for U.S. Appl. No. 11/957,069 mailed Oct. 26, 2009.

Office Communication for U.S. Appl. No. 11/957,069 mailed Jun. 4, 2010.

Office Communication for U.S. Appl. No. 11/948,887 mailed Sep. 9, 2009.

Office Communication for U.S. Appl. No. 11/948,887 mailed Nov. 16, 2009.

Office Communication for U.S. Appl. No. 11/948,887 mailed May 17, 2010.

* cited by examiner

US 7,954,058 B2

SHARING OF CONTENT AND HOP DISTANCE OVER A SOCIAL NETWORK

FIELD OF THE INVENTION

The present invention relates generally to communication on mobile devices, and more specifically, but not exclusively to sharing content over a social network.

BACKGROUND

Tremendous changes have been occurring on the Internet that influence our everyday lives. For example, online social networks have become the new meeting grounds. The development of such online social networks touches countless aspects of our everyday lives, providing instant access to people of similar mindsets, and enabling us to form partnerships with more people in more ways than ever before.

One aspect of our everyday lives that may be affected by online social networking technology is the ease with which news stories and other forms of gossip may be shared over the Internet. However, all too often while some shared news or gossip may be interesting to some people, it may not be interesting to others.

Current web content sharing tools enable copying and pasting content to an application and sending the content. However, copying and pasting web content is cumbersome and difficult to use. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
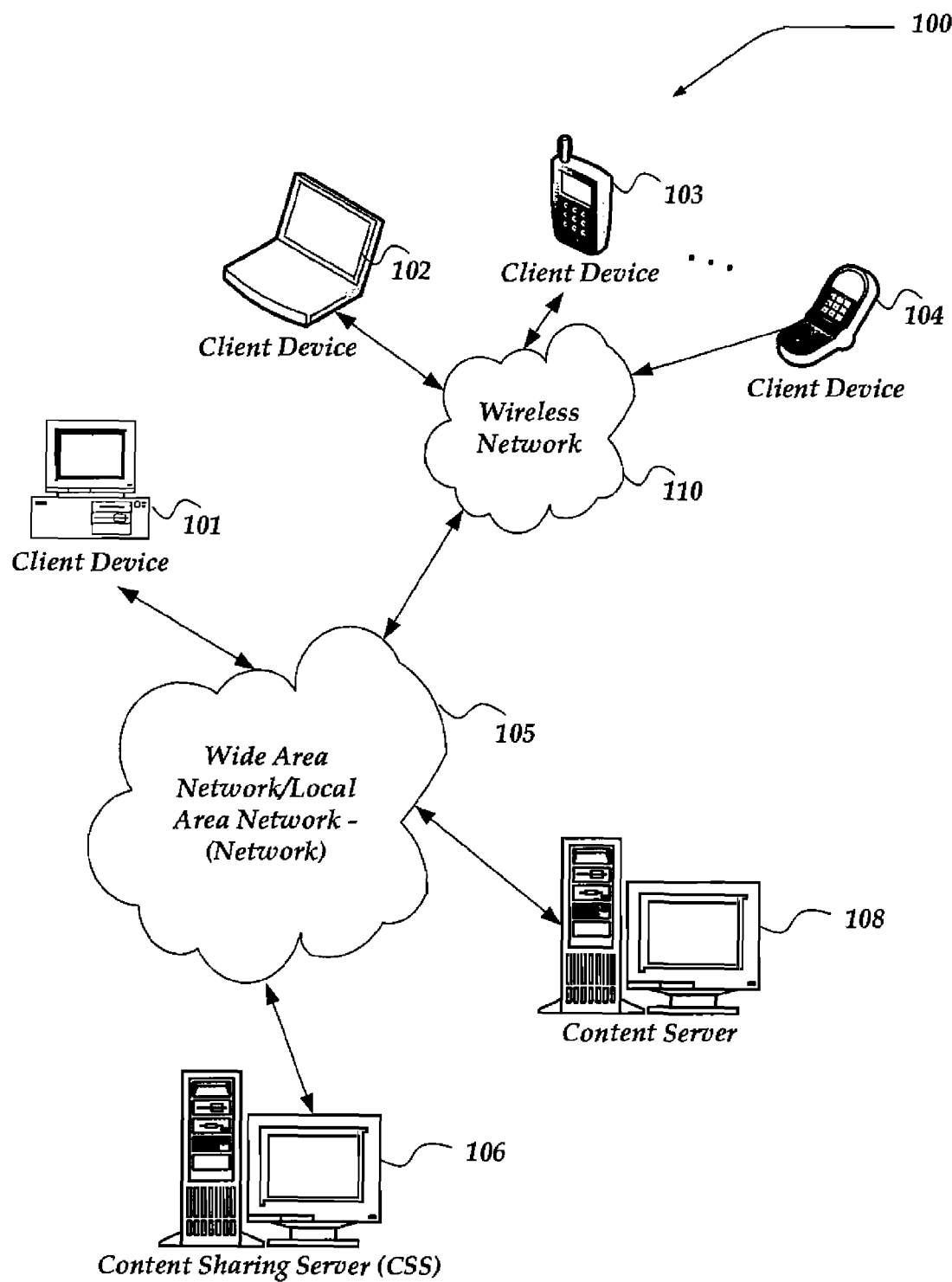
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." As used herein, the terms "device input" or "user input" refer to a user input command at a device.

As used herein, the terms "social network" and "social community" refer to a concept of an individual's personal network of friends, family colleagues, coworkers, and the subsequent connections within those networks. A social network, for example, can be utilized to find more relevant connections for a variety of activities, including, but not limited to dating, job networking, service referrals, content sharing, like-minded individuals, activity partners, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

As used herein, the term "web content" refers to any data displayable within a markup language document, employing for example, Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like. As used herein, the term "hyperlink" refers to an addressing component that enables retrieving data over a network, including a Uniform Resource Identifier (URI), Uniform Resource Locator (URL), or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly, the present invention is directed to sharing information over a network. A drag-and-drop of a selection of a portion of content may be received at a sharing area. A sharing message may be generated based on a type of the portion. If the type of the portion indicates storage, the sharing message may comprise a hyperlink to a storage. The sharing message may be useable for providing the portion on at least one client device associated with at least one of a plurality of members of a social network. Sharing over the network of the portion between an originating sharing member and the plurality of members of the social network may be enabled. The portion may be shared for a customizable project. A hop distance may be provided for the shared portion.

Patent application Ser. No. 11/508,596, entitled "Persistent Saving Portal," filed on Aug. 22, 2006, which is incorporated herein by reference, describes at least one mechanism for copying, organizing, or otherwise sharing content and/or portions of content over a network into a saving portal. A saving portal may be one embodiment of a project, as described herein.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, content sharing server (CSS) 106, and content server 108.

Generally, client devices 102-104 may include virtually any mobile computing device capable of receiving and sending a message over a network, such as wireless network 110, or the like. Such devices include portable devices such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device useable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a Wireless Application Protocol (WAP) message, or the like. In one embodiment, the browser application is enabled to employ Handheld Device Markup Language (HDML), Wireless Markup Language (WML), WML-Script, JavaScript, Standard Generalized Markup Language (SMGL), HyperText Markup Language (HTML), eXtensible Markup Language (XML), or the like, to display and send a message.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), Internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content server 108, CSS 106, or the like. Such user account, for example, may be configured to enable the user to receive emails, send/receive IM messages, SMS messages, access selected web pages, participate in a social networking activity, provide messages that may include hyperlinks or attachments, or the like. However, managing of messages may also be performed without logging into the user account.

Thus, a user of client devices 101-104 may employ any of a variety of client applications to access content, read articles, read messages, compose messages, send messages, or the like. In one embodiment, a user of client devices 101-104 may access a news article, or other item of interest from, for example, content server 108. The user may then select to forward a message to another user of one of client devices 101-104 about the accessed content, article, or the like.

In one embodiment, client devices 101-104 may enable a sharing area for dragging-and-dropping content from another application and sharing the dragged-and-dropped content with members of a social network. Client devices 101-104 may receive a selection of a portion of content. For example, a user may drag a rectangular selection over a portion of an HTML page. The selection may be received using an application programming interface (API) of an operating system, an event trigger, or the like. The selection may be received in the client application (e.g., web browser), in a plug-in to the client application, or the like. The selected portion may then be sent to CSS 106 over networks 105 and/or 110 in preparation for sharing with members of a social network. CSS 106 may provide a hyperlink to at least some types of the selected portion on CSS 106. In one embodiment, if the selected portion is a multimedia object, CSS 106 provides a hyperlink to a copy of the multimedia object on CSS 106. In any case, a hyperlink, or the actual selected portion itself may be forwarded to at least one of client devices 101-104.

The message may be forwarded using any of a variety of message protocols, including but not limited to SMS, IM, MMS, email, or the like. Moreover, in one embodiment, the forwarded message may include a reference to the content, article, or message using, for example, an attachment, a hyperlink, a copy of the content, article, or message within the forwarded message, or virtually any other mechanism. The user may select to forward the message as a form of gossip (or any other form of communication) to members of a social network. It should be noted that the term gossip as used herein refers to a classification of content. However, the invention is not limited to merely managing gossip messages, and any content may be managed using the invention.

In one embodiment, the message may be forwarded anonymously such that the recipients may not readily determine from whom the message is actually forwarded. This may be performed in a variety of ways. For example, in one embodiment, a header of the forwarded message indicating a source of the message may be blank, may include an alias, a fake identifier, or the like.

When another user receives the forwarded message, that recipient user may select to ignore the message, read the message, delete the message, or forward the message to at least one other user of one of client devices 101-104. In one embodiment, as the message is forwarded to other members in the social network, a hop distance may be determined in real-time. In one embodiment, the hop distance may be determined by CSS 106 and provided to each client device receiving and/or forwarding the message. However, the invention is not so limited, and the hop distance may be determined using any of a variety of other mechanisms. For example, in one embodiment, one or more client devices receiving and/or forwarding the message may determine the hop distance. This may be performed using a variety of ways, including, for example, including with the message information about a number of hops the message traversed to reach a recipient; sending an acknowledgement back through a chain of forwarding client devices where the acknowledgments may be used to determine the hop distance; or any of a variety of other ways. Thus, in one embodiment, the hop distance may be determined using any of a variety of peer-to-peer approaches, a server based approach, or even a combination of peer-to-peer and server based approach.

In any event, the hop distance may then be displayed at a client device, in one embodiment, along with the message, to indicate a level of interest by the members of the social network. That is, the more times the message is forwarded by different users in a sequence of users (e.g., client devices) the greater the determined hop distance. Thus, a user may view the hop distance as an indicator of how interesting or newsworthy the message may be.

In one embodiment, to whom the message is to be forwarded may be determined automatically based on an address book, buddy list, or any other form of contact list associated with the user requesting the message to be forwarded. For example, a user may employ a client application to indicate that a message is to be forwarded. When the indication is received by the client device, or other network device, the user's contact list may be examined to determine to whom to forward the message. Embodiments of an interface useable to display and otherwise manage messages using a sharing area are described in more detail below in conjunction with FIGS. 6, 7A, 7B, and 7C.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple CSS 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of cluster server 106 is described in more detail below in conjunction with FIG. 3. Briefly, however, CSS 106 may include any computing device capable of connecting to network 105 to enable managing of messages within a social network. In one embodiment, CSS 106 may provide an interface to a user of client devices 101-104 that may be used to post, spread, delete, or otherwise manage distribution of messages, including gossip messages.

CSS 106 may further dynamically determine hop distances for respective messages, enable rank ordering of messages for a client device, and enable automatic deletion of a message based, in part, on hop distance. In one embodiment, if a message is ignored by a message recipient for a defined time period, the message may also be automatically deleted from a display of messages to the recipient.

CSS 106 may, in one embodiment, provide to a client device, a determined hop distance for display with a respective message. In one embodiment, the hop distance may be configured to be dynamically updated in real-time for the client device as the message is forwarded through a social network of users, such as might be represented by client devices 101-104, or the like. In one embodiment, CSS 106 might be configured to determine hop distance based on how a user of a client device responds to a received message. For example, in one embodiment, where a user receives a message and selects to forward the message to another client device, the hop distance might be determined based on a longest sequence of client devices for which the message is forwarded. In one embodiment, the hop distance displayed at a client device might be independent of whether the user forwarded the message or did not forward the message. That is, in one embodiment, the user might always see the hop distance to reflect the longest sequence, even if that user is not within the longest sequence of users. In another embodiment, if the user is not within the longest sequence, the hop distance displayed for that user might reflect the length of the sequence of users for which that user is a member. However, the displayed hop distance for a given user is not limited to these embodiments, and any of a variety of other hop distances may be determined for display at a client device, without limiting the scope of the invention.

As noted, CSS 106 may receive a selected portion of content that was dragged-and-dropped or otherwise indicated for sharing. CSS 106 may pre-process the selected portion for sharing. In one embodiment, CSS 106 may receive the selected portion, copy the selected portion in a database, create a hyperlink to the selected portion, or the like. CSS 106 may send the selected portion to at least one of client devices 101-104 associated with members of a social network. In another embodiment, CSS 106 may send a hyperlink to the selected portion back to the originating client device requesting CSS 106 to pre-process the selected portion for sharing. In one embodiment, the originating client device may share the hyperlink and/or selected portion using a variety of techniques described above, including a peer-to-peer sharing. CSS 106 may employ a process substantially similar to the process described below in conjunction with FIGS. 4-5 to perform at least some of its actions.

It should be noted that while FIG. 1 illustrates a use of CSS 106 to manage messages based on hop distances and/or shared selected portions of content, the invention is not so limited. For example, as noted above, client devices 101-104 may also be configured with a client application, script, plug-in, applet, or the like, that is configured and arranged to enable the client device to manage messages using hop distances. Moreover, in another embodiment, various functions performed by CSS 106 may be distributed across a plurality of network devices.

Devices that may operate as CSS 106 include personal computers, desktop computers, multiprocessor systems, microprocessor-based or programmable consumer electronics, network PCs, servers, or the like.

Content server 108 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisaged as well.

Content server 108 may include an interface that may request information from a user of client devices 101-104. For example, content server 108 may provide access to an account, which may request user log-in information. Such log-in information may include a user name, password, or other identifier of the user and/or client device used by the user. Moreover, content server 108 may also be configured to manage information for a user, such as an address book, buddy list, or other type of contact list. Such contact lists may be made available to CSS 106, in one embodiment.

Devices that may operate as content server 108 include, but are not limited to personal computers, desktop computers, multiprocessor systems, microprocessor-based or programmable consumer electronics, network PCs, servers, network appliances, and the like.

Illustrative Client Environment

Figure 2:
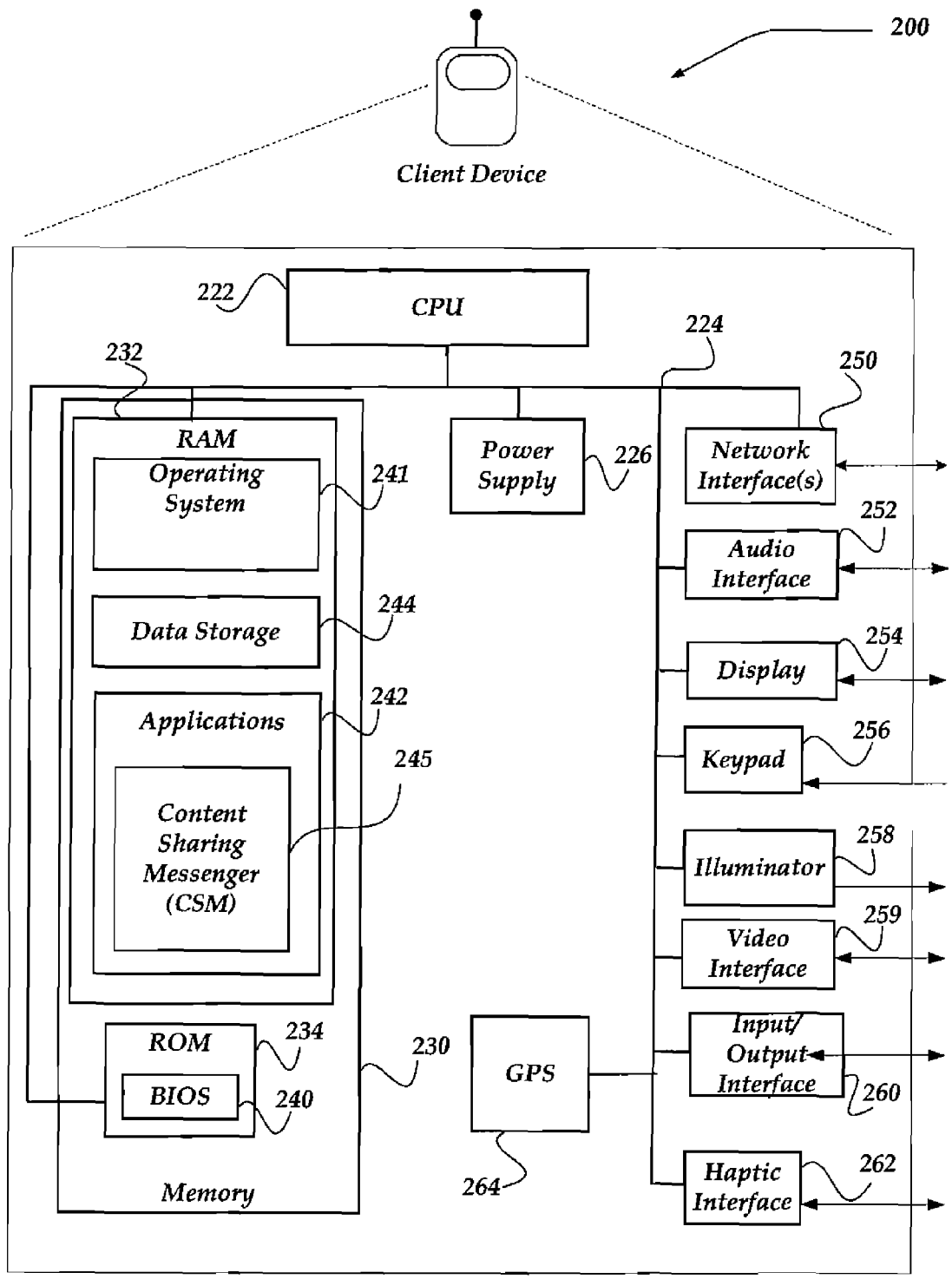
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. Data storage 244 may also include some profile information. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VoIP applications, contact managers, task managers, transcoders, database programs, word processing programs, security applications, spreadsheet programs, games, search programs, and so forth. Applications 242 may also include content sharing messenger (CSM) 245. In one embodiment, CSM 245 may be an application configured to receive a drag-and-drop of content of a plurality of types. CSM 245 may provide at least one window/sharing area. In one embodiment, CSM 245 may enable the sharing area(s) as a stand alone window(s), as part of a browser application, a messenger application, or any other application.

Embodiments of interfaces useable on mobile device 200 for managing messages are described in more detail below in conjunction with FIGS. 6 and 7A, 7B, and 7C. Briefly, CSM 245 may include a sharing area and/or a display list component for displaying a plurality of items, wherein at least one of the items is a shared portion of content and a co-located hop distance that is updated in real-time for each sharing of the portion between at least two members of a social network. CSM 245 may also include a message display component for displaying the shared portion and/or a project component configured to organize the shared portion into at least one project, and transmit/receive over the network interface(s) 250 the shared portion with another device enabling another sharing area, wherein the other sharing area is associated with or otherwise has subscribed to at least one of the projects.

In one embodiment, CSM 245 may include a browser application with a downloadable plug-in, script, applet, or the like, that is configured and arranged to manage messages using hop distances. CSM 245 may include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

CSM 245 may further be configured as a messenger application that is configured to send, to receive, and/or to otherwise process messages using SMS, MMS, IM, email, VoIP, and/or any of a variety of other messaging communication protocols. Although a single CSM 245 is illustrated it should be clear that multiple applications may be employed. For example, one CSM 245 may be configured to manage SMS messages, where another application may manage IM messages, and yet another messaging client is configured to manage emails, or the like, with one or more of such applications being able to manage messages using hop distances.

In one embodiment, CSM 245 may be configured and arranged to manage forwarding of a sharing message. In one embodiment, CSM 245 may be configured to receive a drag-and-drop of a selection of at least a portion of (web) content. The drag-and-drop may be received via an Object Linking and Embedding (OLE) interface, or any other copying mechanism of an operating system. In any case, the selected portion is dragged-and-dropped onto a sharing area to indicate visually that the selected portion is to be shared. CSM 245 may pre-process the selection of the portion for sharing. In one embodiment, CSM 245 may send the selected portion over network interface(s) 250 to a server for further preparation. In one embodiment, based on the type of the selected portion, CSM 245 may receive a hyperlink to a copy of the selected portion. In another embodiment, CSM 245 may pre-process the selected content locally, for example, by copying the selected portion into memory 230, or the like. CSM 245 may host (e.g., through a web server) a copy of the selected portion and may send a hyperlink to the selected portion with a sharing message.

In any case, CSM 245 might automatically determine a list of recipients to whom the sharing message is to be forwarded. In one embodiment, CSM 245 might employ a contact list, or the like, to make such a determination. CSM 245 may send the sharing message to at least another client device. In one embodiment, CSM 245 may send the sharing message to a server over network interface(s) 250 for further sharing, may send the sharing message directly to other client devices over network interface(s) 250, or the like.

Illustrative Network Device Environment

Figure 3:
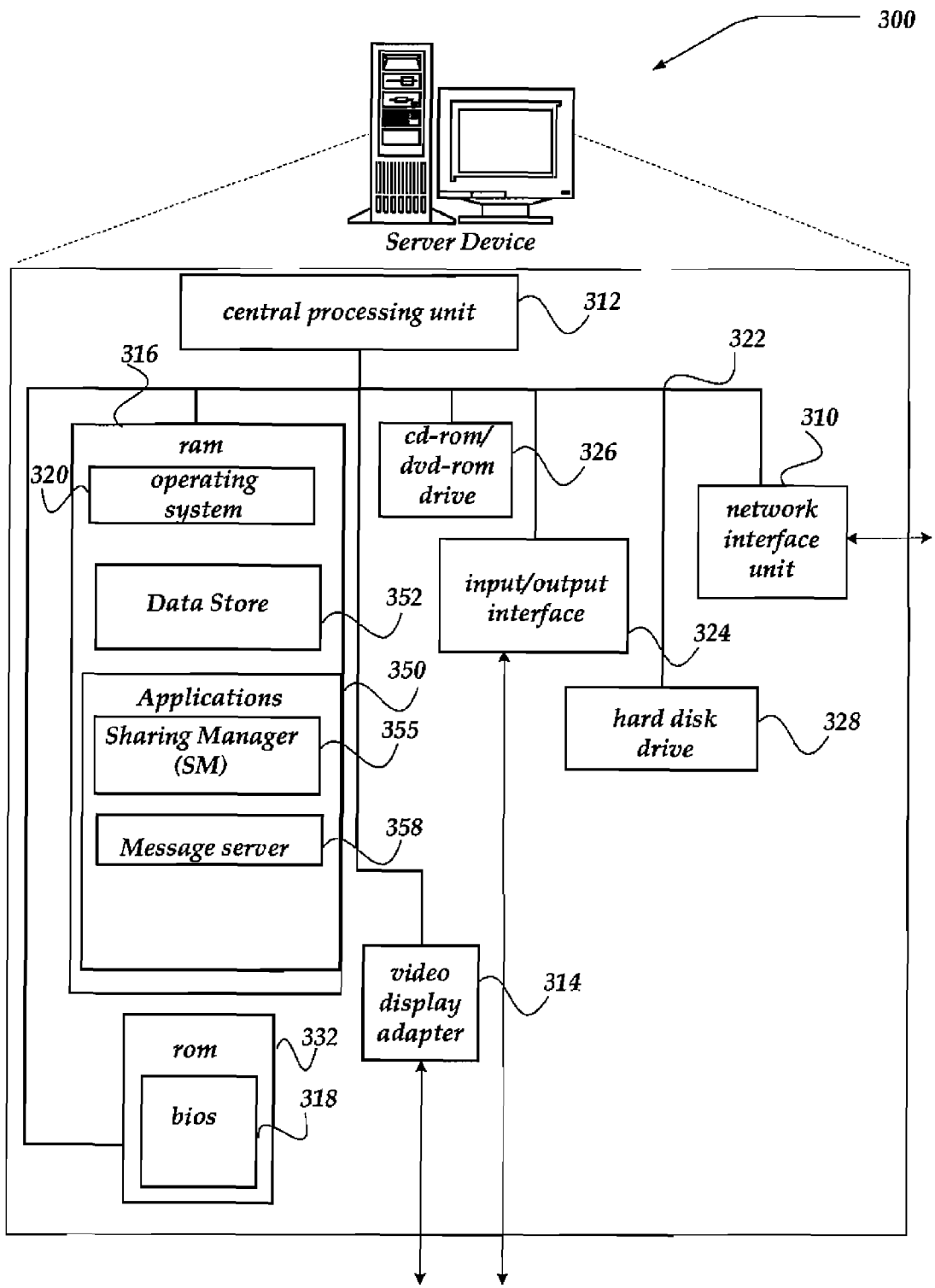
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, CSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Sharing Manager (SM) 355 and message server 358.

Message server 358 may include virtually any computing component or components configured and arranged to forward messages from message user agents, and/or other message servers, or to deliver messages to a local message store, such as data store 352, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types. Moreover message server 358 may also represent a web server configured to enable access to and/or management of messages.

In one embodiment, message server 358 may receive a selected portion of content (e.g., web content) over network interface unit 310 to be pre-processed for sharing. The selected portion may be indicated to be shared with at least one member of a social network (e.g., from a content list of a user, or the like). The selected portion may be indicated as dragged-and-dropped onto a sharing area and to be shared with the at least one member. In one embodiment, message server 358 may determine a type of the selected portion. Based on a type of the selected portion, a copy of the selected portion may be stored on, for example, data store 352 (e.g., in a sharing database). Message server 358 may provide a hyperlink, such as a URL, or the like, to the stored selected portion. In one embodiment, the hyperlink and/or the selected portion itself may be shared with client devices associated with members of the social network over network interface unit 310.

In one embodiment, message server 358 may communicate with SM 355 to enable a user to manage messages using hop distances. In one embodiment, SM 355 may provide a script, applet, application, or other downloadable component, to a client device for use in managing messages using hop distances. In another embodiment, SM 355 may provide information to message server 358, including an interface, or the like, for use in displaying, and/or otherwise managing messages. Although not illustrated, in one embodiment, SM 355 may be configured as a plug-in, or the like, to message server 358. In another embodiment, the hop distance information may be sent to client devices based on a pull of information. For example, client devices may request the selected portion and/or associated hop distance over network interface unit 310. SM 355 may provide the interface based on the request. In another embodiment, each client device indicated as actively receiving the selected portion and/or the hop distance may be sent an update of the hop distance (e.g., in real-time).

In one embodiment, message server 358 may be configured and arranged to receive a message. In one embodiment, the message may be associated with hop distance information. SM 355 may receive the hop distance information, and/or otherwise determine in real-time a hop distance for the message based on the received information. The determined hop distance may then be provided to message server 358 for providing with the message. In one embodiment, the hop distance might not be provided until, for example, the user performs some defined action, such as reading the message, forwarding the message, or the like. In one embodiment, the hop distance determined based on a number of hops the message traversed to the given user might be provided with the message; but, the hop distance might not be updated if other recipients select to forward the message—until, for example, the given user selects to also forward the message. In one embodiment, the message may be displayed to the user in a rank ordering of messages based on message hop distances.

Generalized Operation

Figure 4:
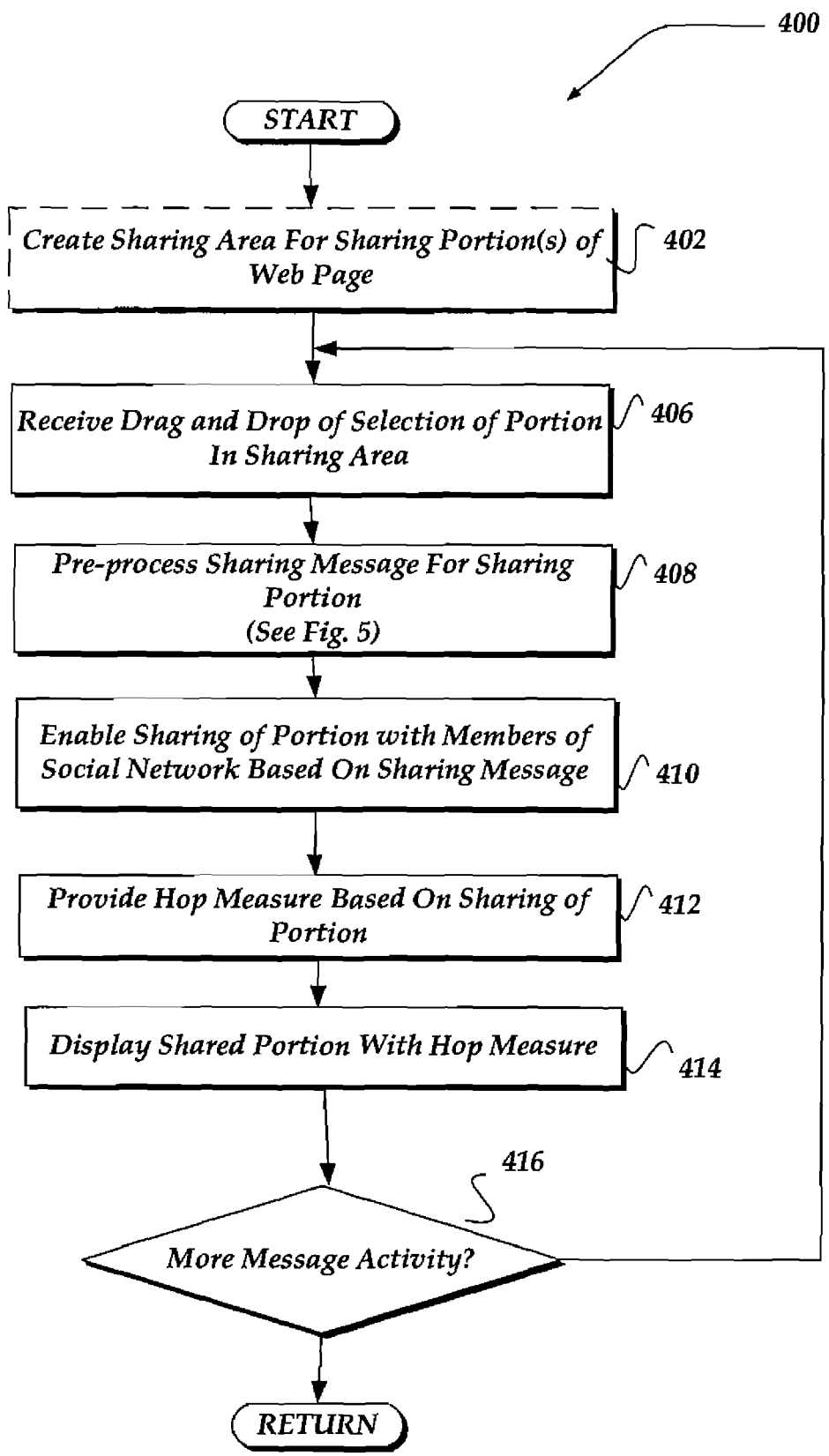
FIG. 4 illustrates a logical flow diagram generally showing one embodiment of a process for sharing messages using a sharing area.
Figure 5:
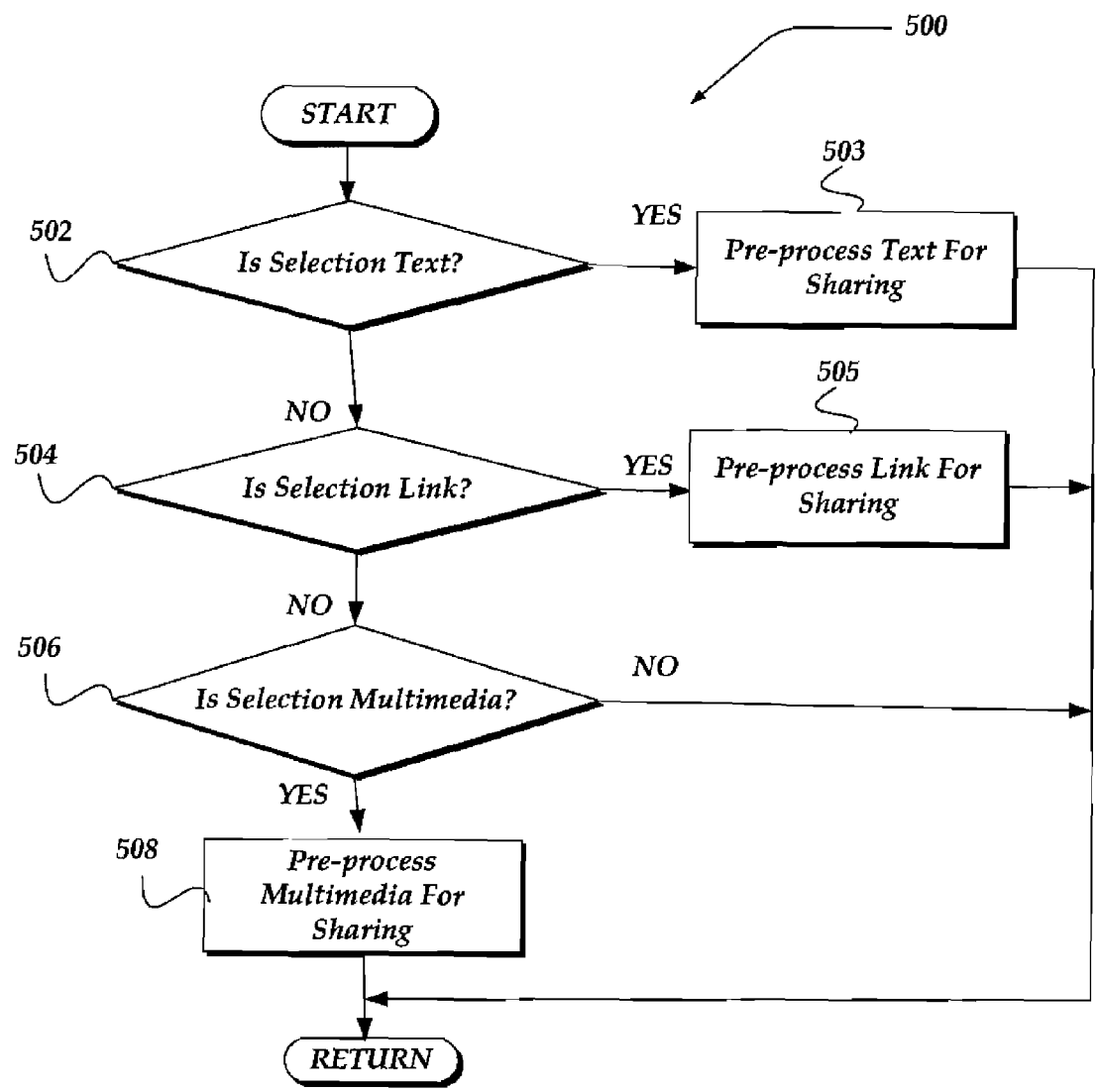
FIG. 5 illustrates a logical flow diagram generally showing one embodiment of a process for pre-processing content for sharing.

The operation of certain aspects of the invention will now be described with respect to FIGS. 4-5. FIGS. 4-5 provide logical flow diagrams of certain aspects of the present invention. The processes of FIGS. 4-5 may be implemented, for example, within client devices 101-104 and/or CSS 106 of FIG. 1.

FIG. 4 illustrates a logical flow diagram generally showing one embodiment of processes for sharing at least one portion of content by at least one member of a social network. Process 400 begins at block 402, where a sharing area is created for sharing portions of at feast one web page. In one embodiment, the sharing area may be associated with a particular sharing type, for example, associated with a group, a project, a plurality of members in the social network, a subset of the members, or the like. The sharing area may be created by a user, a member of the social network, shared between members of a social network, or the like. In one embodiment, an invitation to a user/a device to share content within the project may be sent. In one embodiment, the user/device may subscribe to use the project.

At block 404, a drag-and-drop of the selection of a portion of content is received at a sharing area. In one embodiment, the portion may comprise a Uniformed Resource Locator (URL) and an offset indicating the portion within a web page identified by the URL. In one embodiment, the portion may comprise an HTML fragment. In one embodiment, the selection may be selected with a mouse click, dragged, and then unselected (dropped) into the sharing area, or the like. In one embodiment, a message configured to share the portion of the content is anonymized. In one embodiment, information identifying an originating sharing member may be removed from a message configured to share the portion of the content.

At block 406, a sharing message is pre-processed for sharing the portion. In one embodiment, preparation of the selected portion may be based on the type of the selected portion. The selected portion may be sent within the sharing message and/or stored on a server and a hyperlink to the stored portion may be sent with the sharing message. Process 500 of FIG. 5 shows one process for performing block 406.

At block 408, sharing of at least the portion of the content between an originating sharing member and a plurality of members of a social network is enabled. In one embodiment, the social network may include some or even all contacts in a contact list for a user originating the shared portion—i.e., an originating sharing member. In one embodiment, the contact list may be the list of Instant Messaging (IM) users to which the originating sharing member has access. In one embodiment, meta-data associated with the shared portion may also be sent. For example, the author, date, time to live, or the like, may be sent with the shared portion. In one embodiment, the portion may be stored on a server and/or client device before being sent. In one embodiment, a hyperlink to the stored portion may be sent in the sharing message. In another embodiment, the selected portion may be sent within the sharing message. In one embodiment, the portion may be shared a plurality of times, beginning with the originating sharing member, and/or between a plurality of members of the social network. In an alternate embodiment, at block 408 instead of sharing a plurality of selections of portions one at a time, a plurality of selections may be shared collectively with each other (e.g., within the same communication) by the originating sharing member.

At block 410, a hop distance for the shared portion is determined. In one embodiment, the hop distance may be determined in real-time for the message. In one embodiment, the hop distance may be determined based on a count of each request received to forward the message. Thus, if the message was requested to be forwarded to the user by a previous user, the hop distance might be initially at least one. When the present user requests that the message be forwarded, independent of the number of potential recipients the message is to be forwarded to, the (updated) hop distance would increase by one, and so forth. In another embodiment, the hop distance may be updated as the message is received by a recipient, as the message is sent, or any of a variety of timing points in the process of sending/receiving the message. In one embodiment, an update of the hop distance may be based in part on a number of client devices in a sequence of client devices for which the sharing message is forwarded beyond a client device receiving the sharing message from an originating sharing member, wherein the update of the hop distance indicates an updated level of interest in the portion. In one embodiment, the hop distance may comprise at least two of a topological distance within the social network between members receiving the shared portion, a number of network links between a plurality of client devices receiving the shared portion, a number of times the portion is shared over the network, or any combination thereof.

Figure 6:
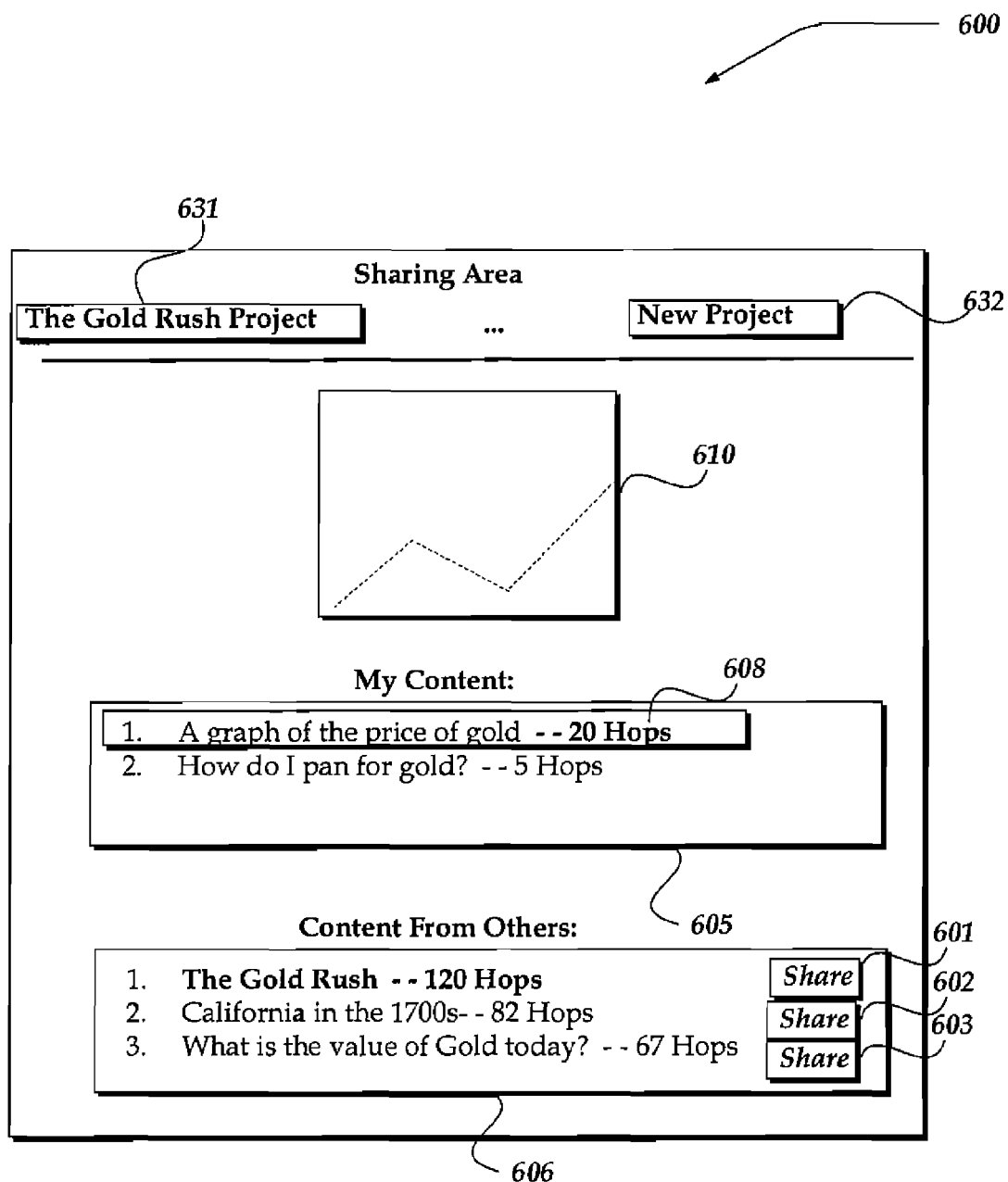
FIG. 6 illustrates an example interface useable for sharing messages in a sharing area.

In addition, an interface at the recipient's client device may be configured to display the message based on the hop distance. For example, FIG. 6 illustrates an example interface useable for managing a drag-and-drop of a selection of content. Shown in FIG. 6 are message lists 605-606 with a plurality of messages, each message having an associated hop distance, such as the hop distance shown for item 608. In one embodiment, the messages may be displayed in a rank ordering based on the hop distances. In another embodiment, the hop distances may be displayed with the messages, however, in yet another embodiment, the hop distance may be hidden. In one embodiment, determination and/or use of the hop distance may be optional.

At block 412, the shared portion may be displayed. In one embodiment, the hop distance may be displayed co-located with the shared portion, e.g., as simply a number, a spreadsheet, a chart, a graph, or the like. In one embodiment, if the shared portion refers to a fragment of a web page (e.g., text, multimedia object, hyperlink, or the like), the actual content associated with the portion may be retrieved and displayed. For example, if the shared portion refers to an image, the image may be retrieved (e.g., using HTTP) and displayed in a sharing area, as shown in sharing area 600 of FIG. 6.

Processing flows next to decision block 414, where a determination is made whether more message activity is to be managed. Such might arise, for example, as a message is forwarded through the social network, new messages are created and sent, or the like. If there is more activity, processing loops back to block 404; otherwise, processing returns to a calling process to perform other actions.

FIG. 5 illustrates a logical flow diagram generally showing one embodiment of a process for pre-processing a drag-and-drop selection of a content for sharing. Process 500 of FIG. 5 begins at decision block 502, where it is determined if a selection is of a text object. If the selection is of a text object, processing continues to block 504. Otherwise, processing continues to decision block 506.

At block 504, the text object is pre-processed for sharing. In one embodiment, the text may be copied into the sharing area. In one embodiment, the user may take an action such as click "Share" to share the content. In another embodiment, the content may be configured to automatically be shared. In one embodiment, the text may be saved in a sharing database, on the client device, and/or sent to and saved on another device. The saved text may be further shared, tracked, or further processed.

At decision block 506, it is determined if the selection is of a hyperlink object. If the selection is of a hyperlink object, processing continues to block 508. Otherwise, processing continues to decision block 510.

At block 508, the hyperlink is pre-processed for sharing. In one embodiment, the hyperlink and/or text of the hyperlink may be copied into the sharing area. In one embodiment, the hyperlink object may be a URL to another web page, an applet, an Embeddable Media Object, or the like. In one embodiment, the user may take an action such as click "Share" to share the content. In another embodiment, the content may be configured to automatically be shared. In one embodiment, the hyperlink and/or text may be saved in the sharing database, on the client device, and/or sent to and saved on another device. The saved hyperlink and/or text may be further shared, tracked, or further processed.

At decision block 510, it is determined if the selection is of a multimedia object. If the selection is of a multimedia object, processing continues to block 512. Otherwise, processing returns to a calling process for further processing.

At block 512, the multimedia is pre-processed for sharing. In one embodiment, the multimedia may be copied or otherwise sent to the sharing database (e.g., on a server device) for reuse. The multimedia object may comprise an image object, an audio (track) object, a video object, or the like. In one embodiment, a hyperlink independent of the originally selected multimedia may be created. The hyperlink may be a URL to the server device. Referring to sharing area interface 600 of FIG. 6, the hyperlink and/or text of the hyperlink may be copied into for example, lists 608 of the sharing area. In one embodiment, the user may take an action such as click "Share" to share the content. In another embodiment, the content may be configured to automatically be shared. In one embodiment, the hyperlink and/or text may be saved in the sharing database, on the client device, and/or sent to and saved on another device (e.g., on a server device). The saved hyperlink and/or text may be further shared, tracked, or further processed. In one embodiment, if the user does not take an action, such as sharing the content (e.g., after a timeout), the multimedia in the database and/or the hyperlink may be deleted from the database. Processing returns to a calling process for further processing.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrated User Interface

Other aspects of the invention will now be described with respect to FIGS. 6, 7A, 7B, and 7C. FIG. 6 illustrates an example interface useable for sharing content using a drag-and-drop interface. Sharing area interface 600 is but one of a variety of sharing areas, and therefore is not to be construed as limiting the invention. As illustrated, sharing area interface 600 includes project buttons 631-632, message display 610, a user's shared content list 605 and a content list 606 of content from others. While one project at a time is shown in sharing area interface 600 within lists, the interface may be provided in any other fashion without departing from the scope of the invention. For example, the project(s) my be organized as folders, files, or the like.

Project buttons may show the current project, allow switching between projects, creating new projects, or the like. As shown, the current project is determined by project button 631 (e.g., "The Gold Rush Project"). Although not shown, if a user creates a new project, pushing, for example, project button 632, the user may be prompted to enter a project name and/or share the project with at least one other user (e.g., member of the social network). The other user's own sharing area interface may then display a project button for sharing items in the newly created project. In one embodiment, the other user may select to subscribe or not subscribe to the project.

Buttons 601-603 represent virtually any mechanism useable to select an action to be performed on a message, including, but not limited to sharing and/or forwarding, editing, deleting, or reading content. As shown, selected content 608 includes an item that was dragged-and-dropped by the user of the sharing area 600 onto sharing area. As shown, the selected content 608 is associated with 20 hop distance. In one embodiment, this represents that the selected content 608 has been shared 20 times with members of the social network. Other items and associated hop distances of the user's shared content and content shared by others are also shown in lists 605 and 606, respectively.

Message display 610 may represent any mechanism useable to read and/or edit, and/or compose a message. As shown, message display 610 shows the content for selected content 608. In general, message display 610 may display a plurality of types of content, including text content, multimedia content (e.g., images, sound, video), or the like. In one embodiment, message display 610 may retrieve the multimedia content over a network using, for example, HTTP.

In one embodiment, sharing area 600 may be provided through a component downloaded onto a client device, such as client devices 101-104. In another embodiment, sharing area 600 might be displayed within a browser window from a remote network device, or the like. Thus, sharing area 600 may be accessible from a client device using a variety of mechanisms, including, but not limited to, a combination of a client component and a remote network device.

In the example shown, if a user finds an interesting portion of content for their project, the user may use sharing interface 600 to drag-and-drop the portion into their project. The sharing interface 600 may be a stand alone component, part of an instant messaging component, or another application. The portion may be saved and converted or otherwise pre-processed for sharing. The portion may be shared to the user's social networks within, for example, one degree of separation. For example, the portion may be shared with the users' friends within the buddy list of an instant messaging application. These friends may be friends who had also previously subscribed to the project.

The friends will be able to view the shared portion(s) (items) as, for example, "Content from others". The friends can then pass those items of interest on to their friends (e.g., members at a second degree of separation from the originating member).

Hop distance may be tracked for the shared portion(s) and recorded in at least one user's sharing interface. For example, an image of a chart of the price of gold may be collected by one student user, sent to the rest of the class, and passed on until most of the students in a school have the image. The originating student user will see, for example, in sharing area interface 600 that one image was passed along 20 times/hops (e.g., using the hop distance), while another image was passed along twice. The user may be able to determine that the 20 hop image is more popular or more relevant, than other shared portions that the user shared.

Figure 7A:
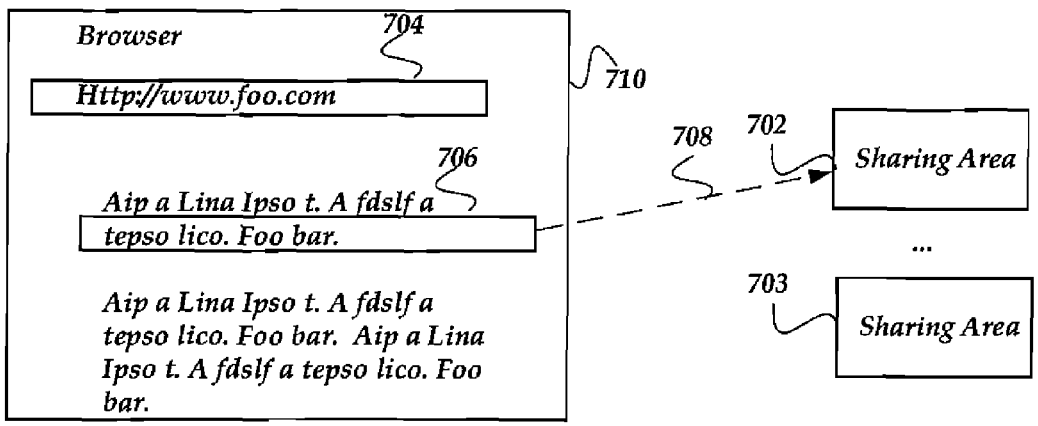
FIGS. 7A-7C show an illustrative process for dragging-and-dropping a portion of content for sharing with members of a social network.
Figure 7B:
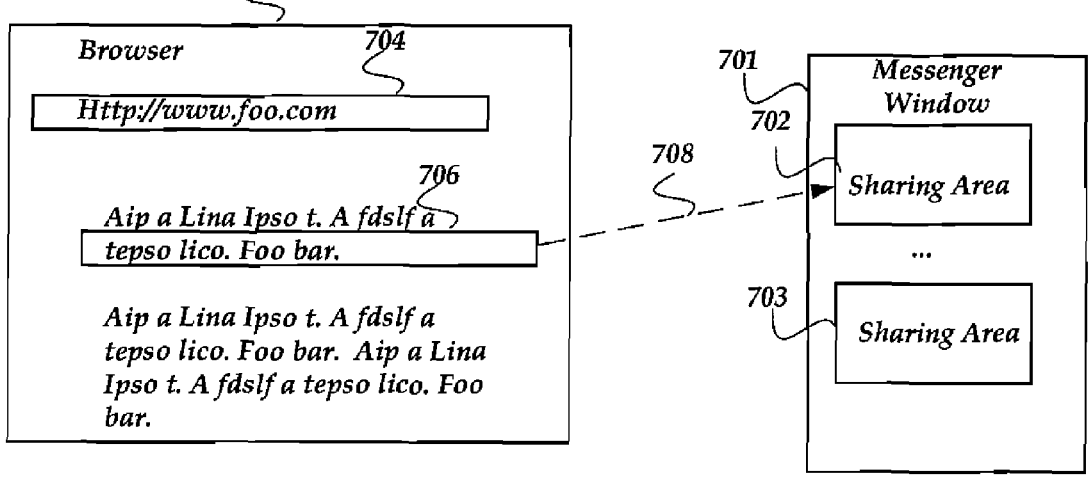
Figure 7C:
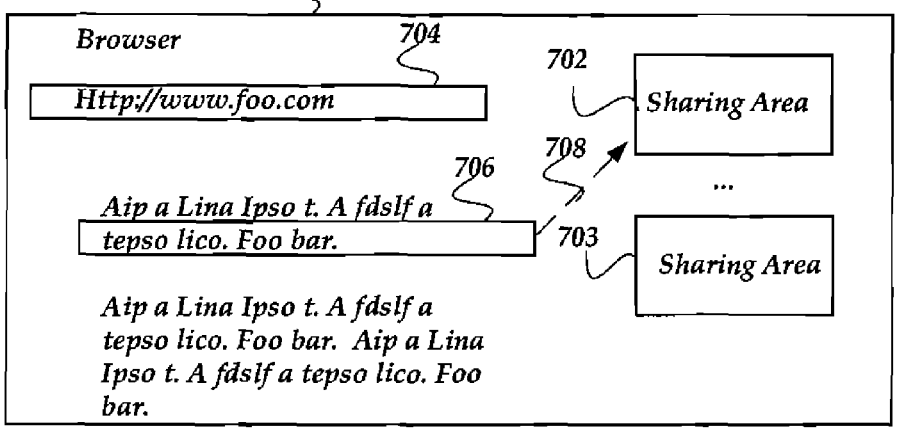

FIGS. 7A-7C show an illustrative process for dragging-and-dropping a portion of content for sharing with members of a social network. FIG. 6A shows a selection 706 of content displayed within a web page. The web page may be displayed in web browser 710 for the URL 704. Selection 706 is dragged visually across the screen using, for example, a cursor, over path 708. Selection 706 is dropped in sharing area 702. As shown, there may be a plurality of sharing areas 702-703 associated with a plurality of different types of sharing. For example, each of sharing areas 702-703 may be associated with a different type of project.

Sharing areas 702-703 may be stand alone windows, as shown in FIG. 7A. However, in other embodiments, sharing areas 702-703 may be part of a messenger window 701, as shown in FIG. 7B, or even part of web browser 710, as shown in FIG. 7C.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A method for sharing information over a network, comprising:
   receiving a drag-and-drop of a selection of a portion of content at a sharing area;
   generating a sharing message based on a type of the portion, wherein if the type of the portion indicates storage, the sharing message comprises a hyperlink to a storage, and wherein the sharing message is useable for providing the portion on at least one client device associated with at least one of a plurality of members of a social network;
   enabling sharing, over the network, of the portion between an originating sharing member and the plurality of members of the social network; and
   providing a hop distance for the shared portion.

2. The method of claim 1, wherein the sharing area is a stand alone window, included within a window of a web browser, or included within another window of a messaging application.

3. The method of claim 1, wherein the hop distance comprises a combination of at least two of a topological distance within the social network between members receiving the shared portion, a number of network links between a plurality of client devices receiving the shared portion, or a number of times the portion is shared over the network.

4. The method of claim 1, wherein the type of the shared portion is at least one of a text object, a hyperlink object, or a multimedia object.

5. The method of claim 1, wherein enabling sharing further comprises:
   forwarding the sharing message from a client device associated with the originating sharing member to another client device associated with at least one of a receiving member of the plurality of members of the social network at a first degree of separation from the originating sharing member; and
   if the receiving member indicates the portion is to be shared, further forwarding the sharing message to another receiving member.

6. The method of claim 1, further comprising:
anonymizing the sharing message configured to share the portion of the content.

7. The method of claim 1, further comprising:
receiving an update in real-time of the hop distance for each sharing of the portion by at least one member of the social network.

8. The method of claim 1, further comprising:
receiving the portion by a member of the social network over a plurality of degrees of separation, if a receiving application associated with a receiving member is actively accepting shared content.

9. The method of claim 1, further comprising:
receiving another drag-and-drop of at least another selection of another portion before sharing, wherein the portion is shared collectively with the other portion.

10. A client device for sharing information over a network, comprising:
a transceiver for communicating data;
a processor configured to perform actions comprising:
receiving a drag-and-drop of a selection of a portion of web content at a sharing area;
sharing the portion with a plurality of members of a social network; and
providing a display of at least the portion and an associated hop distance for the shared portion.

11. The client device of claim 10, wherein the client device is a mobile device.

12. The client device of claim 10, wherein the actions further comprise:
creating the sharing area associated with a project; and
sending an invitation to another device to share content within the project.

13. The client device of claim 10, wherein the actions further comprise:
if the portion is a multimedia object, receiving a hyperlink to a copy of the portion from another device, before sharing the portion, wherein the sharing of the portion comprises sharing the received hyperlink.

14. The client device of claim 10, wherein the actions further comprise:
modifying the display to change an ordering of the portion based on a change in the associated hop distance.

15. The client device of claim 10, wherein the portion comprises a Uniformed Resource Locator (URL), an offset indicating the portion within a web page identified by the URL, or a generated hyperlink to a multimedia object associated with the portion.

16. A system for sharing information over a network, comprising:
a display list component for displaying a plurality of items, wherein at least one of the items is a shared portion of content and a co-located hop distance that is updated in real-time for each sharing of the portion between at least two members of a social network;
a message display component for displaying the shared portion; and
a sharing area configured to perform actions comprising:
receiving a drag-and-drop of the shared portion;
generating a sharing message comprising the shared portion or a hyperlink to the shared portion; and
forwarding the sharing message to a least one member of the social network.

17. The system of claim 16, further comprising:
a project component configured to perform actions comprising:
organizing the shared portion into at least one project; and
transceiving over the network the shared portion with another sharing area, wherein the other sharing area is associated with at least one of the projects.

18. An apparatus for sharing information over a network, comprising:
a transceiver for communicating data;
a processor configured to perform actions comprising
receiving, over the network, a drag-and-drop selection of a portion of web content, wherein the drag-and-drop selection is associated with a project;
generating a sharing message based on a type of the portion, wherein if the type indicates storage, the sharing message comprises a hyperlink generated and configured to provide at least a part of the portion from a storage, and otherwise including the portion in the sharing message;
forwarding, over the network, the sharing message to at least one client device associated with the project; and
providing, in real-time, an update of a hop distance for the shared portion to the at least one client device.

19. The apparatus of claim 18, wherein the update of the hop distance is based in part on a number of client devices in a sequence of client devices for which the sharing message is forwarded beyond a client device receiving the sharing message from an originating sharing member, wherein the update of the hop distance indicates an updated level of interest in the portion.

20. The apparatus of claim 18, wherein forwarding the sharing message comprises:
forwarding the sharing message to each contact within a contact list associated with an originating sharing member such that the sharing message is sent to each contact once.

* * * * *

UNITED STATES PATENT AND TRADEMARK OFFICE
CERTIFICATE OF CORRECTION

| | | |
|---|---|---|
| PATENT NO. | : 7,954,058 B2 | Page 1 of 1 |
| APPLICATION NO. | : 11/956875 | |
| DATED | : May 31, 2011 | |
| INVENTOR(S) | : Chris Kalaboukis et al. | |

It is certified that error appears in the above-identified patent and that said Letters Patent is hereby corrected as shown below:

In column 1, line 41, delete "wherein;" and insert -- wherein: --, therefor.

In column 13, line 65, delete "feast" and insert -- least --, therefor.

In column 17, line 2, delete "my" and insert -- may --, therefor.

In column 20, line 13, in Claim 16, delete "a least" and insert -- at least --, therefor.

Signed and Sealed this
Third Day of January, 2012

David J. Kappos
*Director of the United States Patent and Trademark Office*